United States Patent
Caluori (10) Patent No.: US 6,915,727 B2
(45) Date of Patent: Jul. 12, 2005

(54) ANGLED LIGHT BEAM ROTARY SAW CUT ALIGNMENT DEVICE

(76) Inventor: Raymond Caluori, 5 Briggs St., Quincy, MA (US) 02170

( * ) Notice: Subject to any disclaimer, the term of this patent is extended or adjusted under 35 U.S.C. 154(b) by 0 days.

(21) Appl. No.: 10/207,502

(22) Filed: Jul. 29, 2002

(65) Prior Publication Data

US 2003/0116000 A1 Jun. 26, 2003

Related U.S. Application Data

(60) Provisional application No. 60/309,157, filed on Jul. 31, 2001.

(51) Int. Cl.⁷ .............................. B26D 7/00; B27B 5/29
(52) U.S. Cl. ..................... 83/521; 83/522.17; 83/477.1; 83/663; 30/388
(58) Field of Search ......................... 83/520, 521, 490, 83/676, 633, 469, 522.18, 522.26, 522.19, 522.21, 477.1, 471.2, 471.3, 522.15, 522.17, 478; 451/6; 408/16; 362/89, 259, 287, 84, 285, 553; 30/392, 388, 123, 390, 391

(56) References Cited

U.S. PATENT DOCUMENTS

| | | | | |
|---|---|---|---|---|
| 4,885,967 A | * | 12/1989 | Bell et al. ..................... | 83/520 |
| 5,121,188 A | * | 6/1992 | Patridge et al. ............. | 257/680 |
| 5,375,495 A | * | 12/1994 | Bosten et al. ................. | 83/520 |
| 5,446,635 A | * | 8/1995 | Jehn ............................ | 362/259 |
| 5,461,790 A | * | 10/1995 | Olstowski ..................... | 30/391 |
| 5,675,899 A | * | 10/1997 | Webb .......................... | 30/390 |
| 5,862,727 A | | 1/1999 | Kelly | |
| 5,996,460 A | * | 12/1999 | Waite .......................... | 83/520 |
| 6,035,757 A | | 3/2000 | Caluori et al. | |
| 6,497,168 B1 | * | 12/2002 | Levine ......................... | 83/520 |
| 6,755,107 B2 | * | 6/2004 | Peot et al. .................... | 83/478 |
| D492,951 S | * | 7/2004 | Caluori ....................... | D15/133 |
| 2002/0170404 A1 | * | 11/2002 | Peot et al. .................... | 83/478 |
| 2003/0140758 A1 | * | 7/2003 | Weusthof et al. ............. | 83/490 |
| 2004/0159199 A1 | * | 8/2004 | Peot et al. .................... | 83/478 |
| 2004/0194600 A1 | * | 10/2004 | Wu et al. ..................... | 83/520 |

* cited by examiner

*Primary Examiner*—Boyer D. Ashley
(74) *Attorney, Agent, or Firm*—Brian M. Dingman, Esq.; Mirick, O'Connell, DeMallie & Lougee, LLP (57) ABSTRACT

A cut alignment device for a rotary saw having a motor which spins a cutting unit which includes a rotary shaft driven by the motor, a circular blade having a central aperture through which the shaft fits, and a blade mounting device for holding the blade on the shaft. The cut alignment device includes a battery power source carried by the cutting unit; and a beam light source, operatively connected to this power source, and carried by the cutting unit. The light source projects a light beam at a shallow angle from the cutting unit directed to intersect the plane of the rotary cutting tool or saw blade, to assist the operator in cutting accurately.

52 Claims, 6 Drawing Sheets

ANGLED LIGHT BEAM ROTARY SAW CUT ALIGNMENT DEVICE

CROSS REFERENCE TO RELATED APPLICATION

This application claims priority of provisional application Ser. No. 60/309,157 filed on Jul. 31, 2001.

FIELD OF THE INVENTION

This invention relates to a saw-mounted cut alignment device for a rotary saw which projects a line of light along the cut line.

BACKGROUND OF THE INVENTION

Rotary saws such as circular saws, chop saws, radial arm saws, miter saws and table saws require that the operator properly align the material being cut with the saw blade. This takes time and care, but is critical for a proper cut.

There exist laser-based cut alignment devices which are externally mounted in the vicinity of the saw, and project a light beam along the cut line. These devices must be manually aligned before cutting begins, thus requiring experience and additional time. Also, the operator must monitor this additional piece of equipment in order to use the alignment device properly. Accordingly, devices of this nature are not practical for most saw owners and operators.

SUMMARY OF THE INVENTION

It is therefore an object of this invention to provide a cut alignment device for a rotary saw.

It is a further object of this invention to provide such a cut alignment device which is mounted to the saw.

It is a further object of this invention to provide such a cut alignment device which is automatically self-aligning with the blade cut line.

It is a further object of this invention to provide such a cut alignment device that requires no operator set-up.

It is a further object of this invention to provide such a cut alignment device that illuminates a line on the material to be cut along the blade cut line.

It is a further object of this invention to provide such a cut alignment device that turns on only when the saw is activated.

It is a further object of this invention to provide such a cut alignment device that decreases the amount of time required for a saw operator to align the material with the cutting edge of the saw blade.

It is a further object of this invention to provide such a cut alignment device that increase the safety of operating the saw.

This invention results from the realization that rotary saws can be made more accurate and easier to use with a light-source mounted on the rotating portion of the saw which projects a beam of light along the saw blade cutting line.

This invention features a cut alignment device for a rotary saw having a motor which spins a cutting unit which includes a rotary shaft driven by the motor, a circular blade having a central aperture through which the shaft fits, and a blade mounting device for holding the blade on the shaft, the cut alignment device comprising: a battery power source carried by the cutting unit; and a beam light source, operatively connected to the power source, and carried by the cutting unit; wherein the light source projects a light beam from the cutting unit directed along the plane of the blade, to assist the operator in cutting accurately.

The cut alignment device may further include a switch between the power source and the light source for selectively applying power to the light source. The switch may be centrifugally engaged to automatically power the light source when the shaft is spinning. The light source may be mounted within the blade mounting device, and the blade mounting device may define an aperture from which the light beam emanates. The device may further include a focusing lens aligned with the aperture for focusing the light from the light source.

The blade-mounting device may include a blade lock washer held on the shaft against the blade, and wherein the light source is mounted within the blade lock washer. The battery power switch may be mounted within the blade-mounting device.

Also featured is a cut alignment device for a rotary saw having a motor which spins a cutting unit which includes a rotary shaft driven by the motor, a circular blade having a central aperture through which the shaft fits, and a blade mounting device for holding the blade on the shaft, the cut alignment device comprising: a battery power source mounted within the blade lock washer; a light source operatively connected to the power source and mounted within the blade lock washer, wherein the blade lock washer defines an aperture from which the light emanates; and a centrifically-engaged switch between the power source and the light source and mounted within the blade lock washer to automatically power the light source when the shaft is spinning; wherein the light source projects a light beam from the aperture directed along the plane of the blade to assist the operator in cutting accurately.

This invention relates to a light-emitting rotary saw cut alignment device of the type disclosed in U.S. Pat. No. 6,035,757. The inventive assembly accomplishes a light source that is focused and adjusted to the correct angle to the cutting blade, and then fixed in place so that the resulting light beam falls where desired along the cut line at the location where the rotary blade contacts the material being cut.

A key to the successful operation of a light-emitting rotary saw cut alignment device is to have the light beam focused at the proper location relative to the saw and at the proper distance from the device, such that it forms a sharp beam or line at the correct location on the material being cut. Also, the beam needs to intersect the material being cut at the correct point at which the blade will contacting the material being cut. It has been found that these objectives can be accomplished with the construction shown in the drawings, which provide for focusing and proper angular displacement of the light emitted from the laser diode as part of the device assembly process. The members can then be fixed in place in the final assembly so that the device is ready for use.

In this invention, the light is emitted from a device that is held on the blade arbor, against the blade. In order to be useful with chop saws and miter saws and all types of rotary saws, it is desirable to have the light beam leave the device housing very close to the surface of the blade, preferably between 0.001 and 0.160 inches from the blade surface. This distance is dictated in part by the thickness of the wall of the device housing that rests against the blade, and in part by the construction and layout of the diode and lens assembly, as more fully described below. Preferably, this construction is such that the beam leaves the housing at a shallow angle that is sufficient to cause the beam to intersect the plane of the cutting blade about six inches to eight feet from the housing. The device can be configured to be turned on or off manually as well as automatically.

BRIEF DESCRIPTION OF THE DRAWINGS

Other objects, features and advantages will occur to those skilled in the art from the following description of the preferred embodiments, and the accompanying drawings, in which.

DETAILED DESCRIPTION OF THE PREFERRED EMBODIMENTS

One embodiment of the inventive device is shown in FIGS. 1–6. Device 10 includes stainless steel housing 12 that provides the structural integrity for the device. The raised central cross-shaped portion 13 protects the electronic components that are located in the pockets 21–24 created thereby (not shown fully in the drawings) so that they are not crushed when the device is placed on an arbor and the nut is tightened down; it also maintains the integrity of the housing so that it doesn't bend and change the alignment of the laser beam. Also, this construction helps to maintain the device to be sufficiently mass-balanced around the center of the device, so that it is relatively rotationally balanced. Battery holder 16 is a plastic molded part that has three cavities to hold three button cells 25 in a manner such that their tops and bottoms are exposed, so that electrical contact can be made. The holder has a central cross-shaped opening that allows it to fit over the central portion of the housing. Washer 18 is the cover for the assembly. Part 14, not shown in detail in the drawings, is a circuit board that provides the electrical connections between the batteries and from the centrifugally-operated switch 52 to the laser diode. The result is a device that emits light only when the arbor to which it is attached is rotating.

Figure 1A:
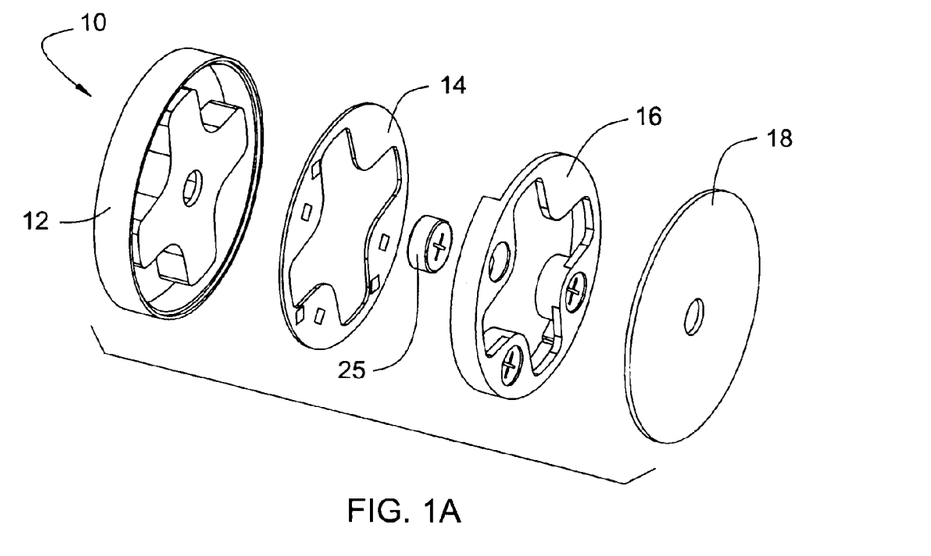
FIGS. 1A and 1B are exploded views of one embodiment of the cut alignment device of this invention.
Figure 1B:
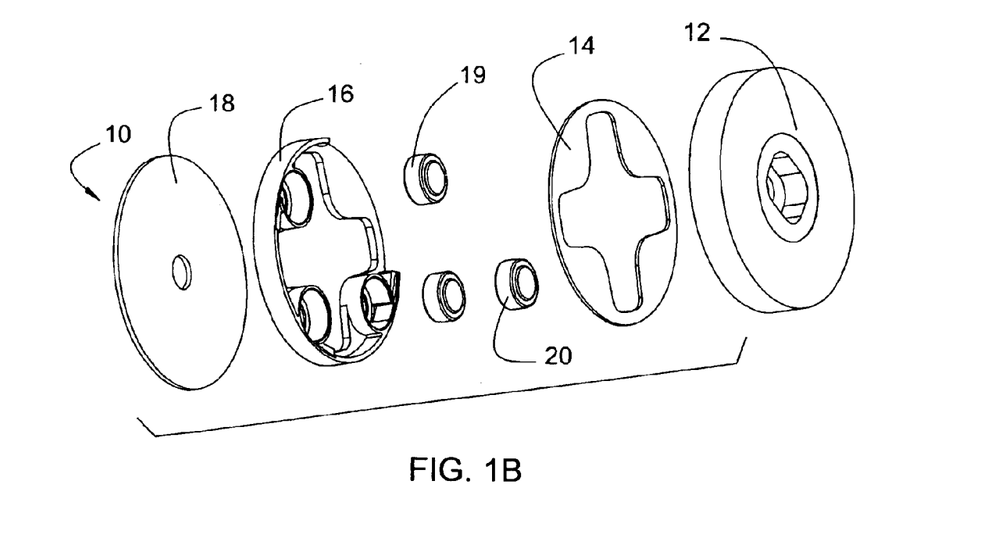
Figure 2:
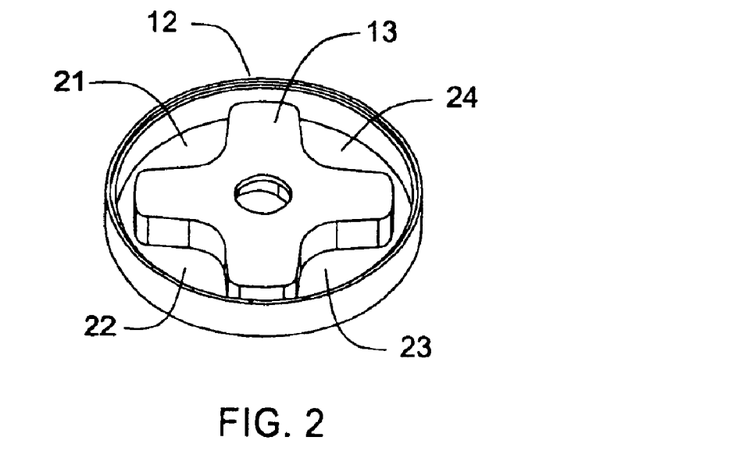
FIG. 2 is a view of the housing of FIG. 1.
Figure 3:
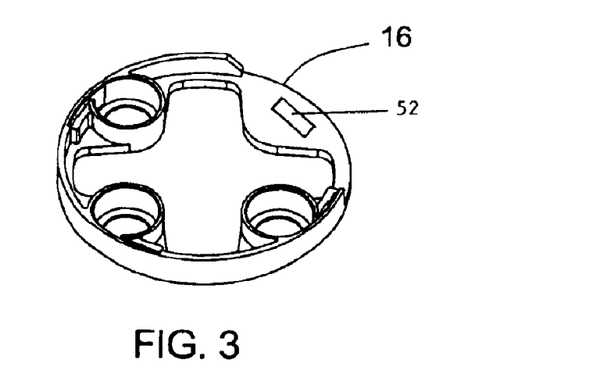
FIG. 3 is a view of the battery holder of FIG. 1.
Figure 4:
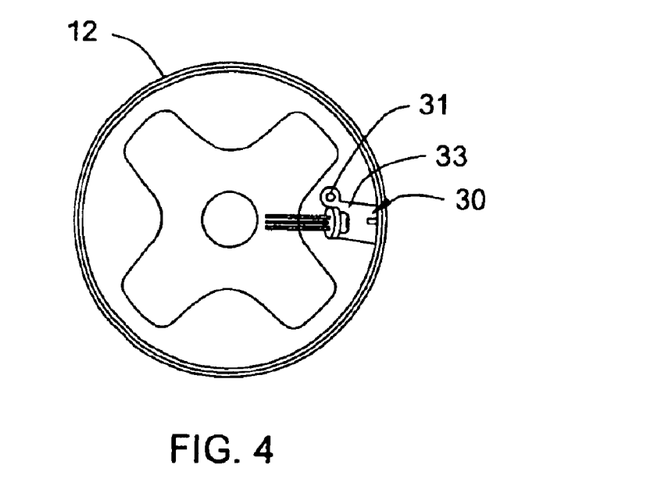
FIG. 4 is a greatly enlarged lop view of a partially assembled device of FIG. 1.
Figure 5:
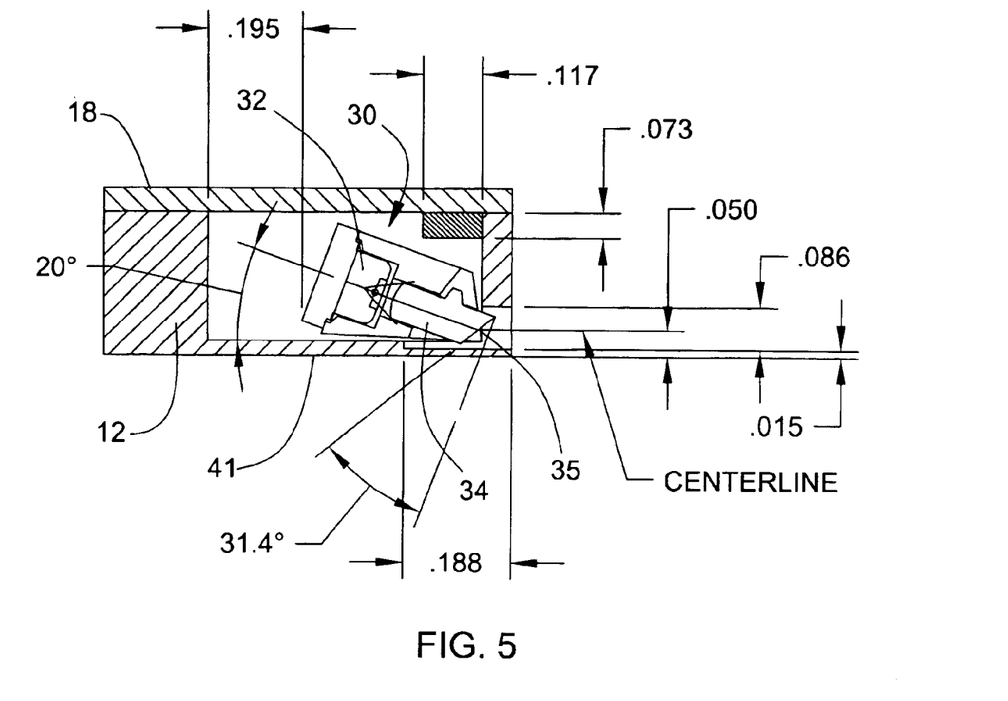
FIG. 5 is a partial cross-sectional view of the assembled device of FIG. 1.
Figure 6:
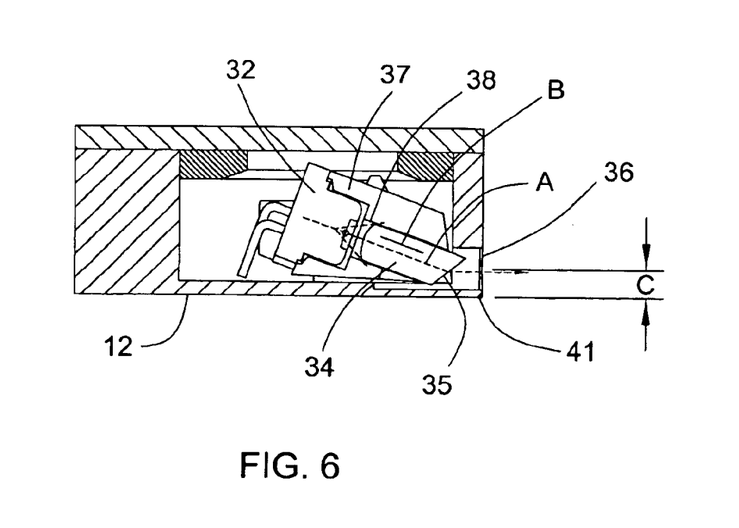
FIG. 6 is a partial cross-sectional greatly enlarged view of a portion of the assembly of FIG. 5.

Optical assembly 30 is shown in FIGS. 4–6. Laser diode 32 is held in housing 37. Lens 34 is slideable in the direction of arrow B within cylindrical bore 38 of housing 37. Lens 34 has an angled light emitting distal end 35 that refracts the light beam along axis A, so that the beam is emitted almost, but not quite, parallel to the bottom surface 41 of housing 12. It is critical to the invention that the beam be angled toward the plane of the saw blade rather than be parallel to it, so that it intersects the plane of the blade surface at a desired location, to provide a cutting guide as appropriate for the type of saw and the diameter of the saw blade. The preferred dimensions and angles are shown in FIG. 5.

Opening 31 in extended housing portion 33 accepts a housing adjustment screw during final assembly of the device. A screw is placed through hole 31 and moved until it contacts the bottom of housing 12. Adjustment of the screw adjusts the angle of somewhat flexible housing portion of 33, to change the angle of lens 34 relative to housing 12. This is the means by which the angle of the beam emitted from lens 34 relative to the saw blade is adjusted during final assembly. The sliding engagement of lens 34 along barrel 38 focuses the light beam at the correct distance from the housing. This sliding focus and the angle adjustment allow the beam to be directed and focused to intersect the saw blade plane at a desired distance from the housing, to accomplish the result described above. Also as described above, the distance from bottom 41 of housing 12 to the lower portion of the light beam, is preferably from 0.001–0.160 inches. Once the diode and lens assembly is properly set in the assembly process, the lens and assembly are fixed in place using a heat conductive epoxy that also helps to conduct heat from the laser diode to the housing so that the housing can act as a heat sink.

Figure 7A:
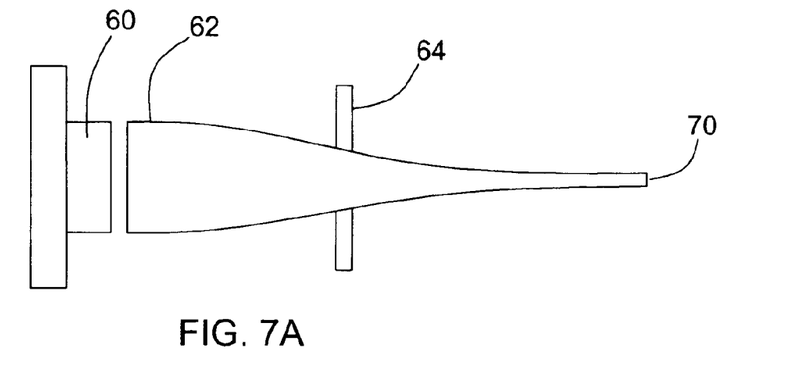
FIGS. 7A and 7B are top and side views, respectively, of an alternative form of delivering the laser light for the device of this invention.
Figure 7B:
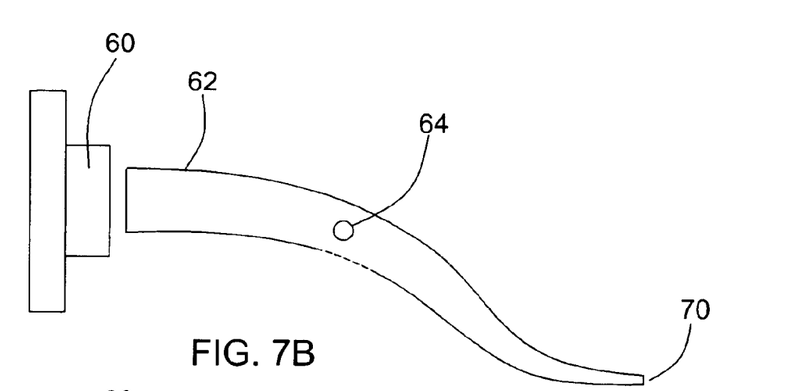
Figure 8:
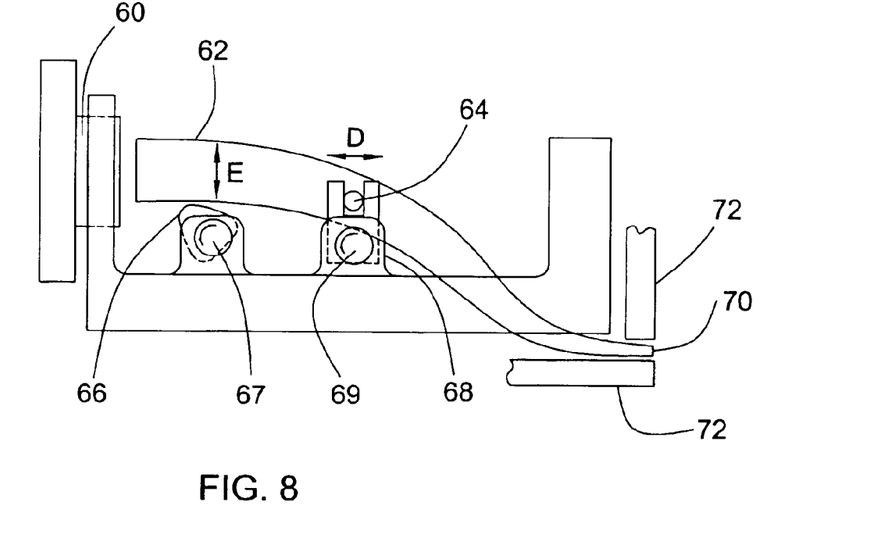
FIG. 8 is a more detailed side view of the light delivery means shown in FIG. 7.

FIGS. 7 and 8 disclose an alternative means of delivering light from laser diode 60 using light pipe 62 with distal end 70 that is held in a proper sized opening (FIG. 8) at the lower side of housing 72. Preferably the light pipe has a consistent diameter along its length, so that it more efficiently delivers light to the source. The focus and angle adjustment is accomplished in this example, by movement of light pipe 62 up and down in the direction of arrow E and back in forth in the direction of arrow D. Cam 66 provides the up and down motion by turning of knob 67 that is fixed to cam 66. The back and forth motion is provided by cam 68 that pushes on rod 64 that projects from light pipe 62. Cam 68 is moved by rotation of knob 69.

Figure 9A:
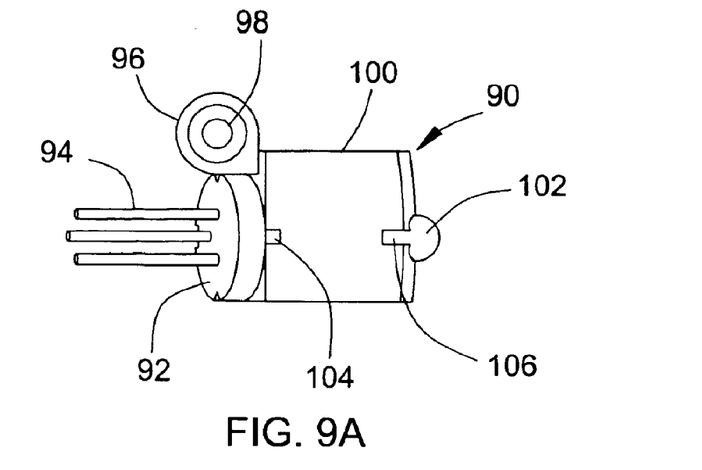
FIGS. 9A–9C are top, perspective and cross-sectional views, respectively, of an alternative embodiment of the laser light delivery means for the invention.
Figure 9B:
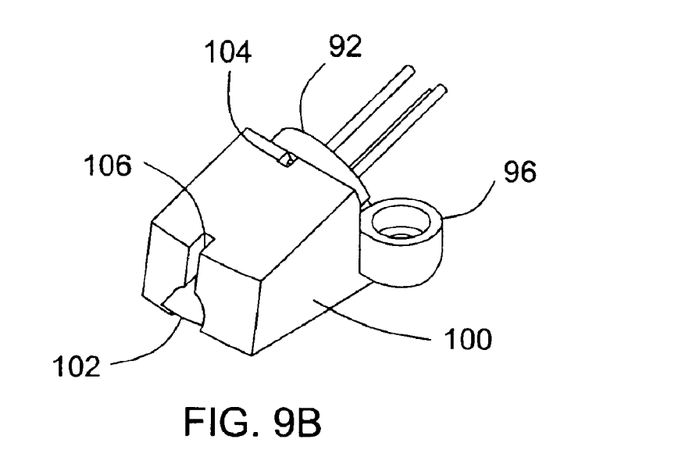
Figure 9C:
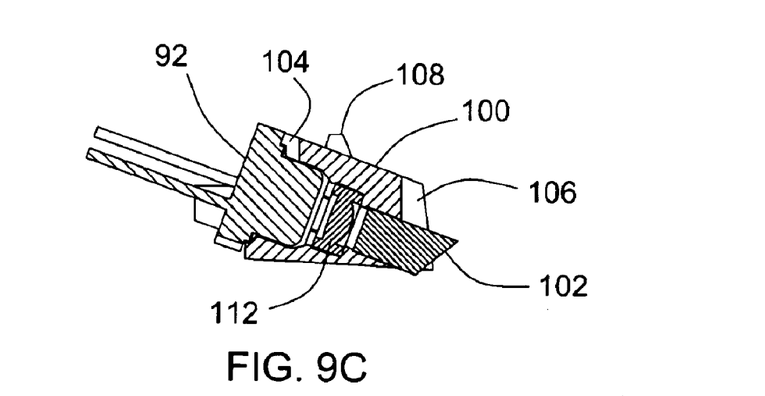

FIGS. 9A–9C show another embodiment of a diode and focusing lens construction, similar to that of the embodiment of FIGS. 1–6. Assembly 90 includes laser diode 92 with leads 94 held in housing 100 in proximity to lens combination 102 and 112. Lens 102 is axially slideable within housing 100 similar to the embodiment shown in FIGS. 5 and 6. Protruding holder 96 with opening 98 provides the screw-enabled height adjustment as described above. Slots 104 and 106 are provided so that laser diode 92 and lens 102 can be fixed-in place relative to housing 100 by introducing a glue or adhesive into the slots once the diode and lens are in the proper position to place and focus the beam as desired.

Figure 10:
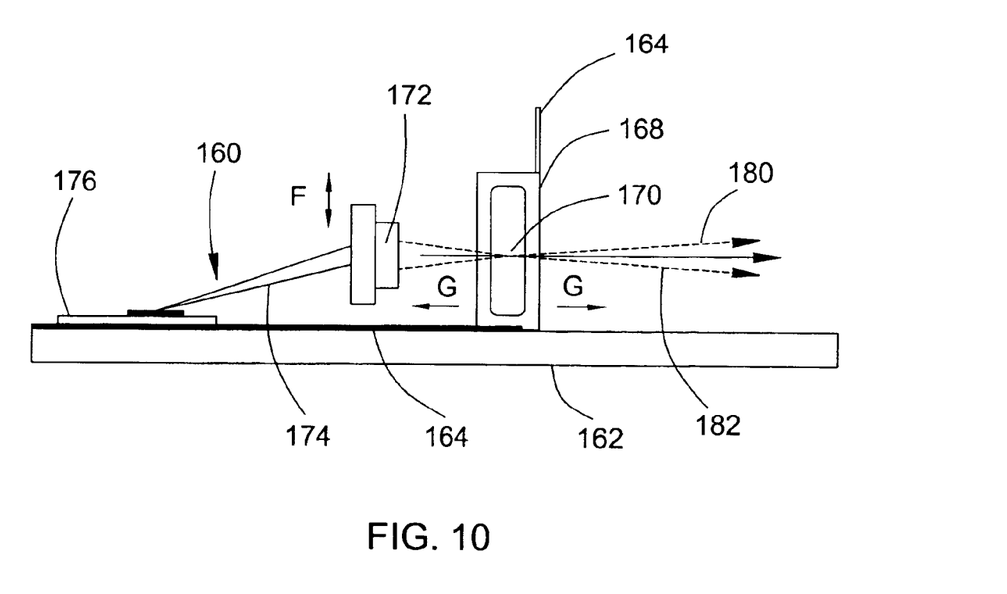
FIG. 10 is a partial cross-sectional side view of the preferred embodiment of the laser diode light delivery location and focusing means of the invention.

The preferred embodiment of the laser diode placement and focusing means is shown in FIG. 10. Laser diode 172 has leads 174 that are soldered to circuit board 176 that is coupled to housing 164. Lens 170 is held in annular lens holder 168 that is received by threads or other means in housing 164 to allow holder 168 to be moved in direction of arrows G relative to housing 164, to change the distance between diode 172 and lens 170 and thus achieve a proper beam focus. The beam path, several of which are shown by paths 180, is established as desired (typically a shallow downward angle relative to saw blade 162 as depicted by path 182), by physically moving diode 172 up or down in the direction of arrow F. When the desired diode location and lens location are achieved, diode 172 is set in place relative to the housing using a heat conductive epoxy that also helps to transfer heat from diode 172 to housing 164 so that the housing can act as a heat sink.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A cut alignment device for a rotary saw having a motor which spins a cutting unit, the cutting unit including a rotary shaft driven by the motor, a circular blade having a central aperture through which the shaft fits, and a blade mounting device for holding the blade on the shaft, in which the blade-mounting device comprises a structural housing that is held on the shaft against the blade, and wherein a light source is located within the structural housing, the cut alignment device comprising:

a battery power source carried within the structural housing;

the light source, operatively connected to the power source, and carried within the structural housing wherein the light source projects a light beam from the structural housing directed toward the plane of the blade, to assist in cutting accurately; and wherein the structural housing is essentially a partially hollow cylinder with a raised inner central portion and at least two spaced raised support arms radiating from the central portion, the support arms thereby defining two or more pockets in which the battery power source and the light source are located.

2. The cut alignment device of claim 1 wherein the battery power source is located in one pocket and the light source is located in a different pocket.

3. The cut alignment device of claim 1 further comprising a somewhat flexible housing located within the structural housing and to which the light source is coupled, and at least one adjustment screw received in the flexible housing, wherein movement of said at least one adjustment screw relative to the flexible housing alters the spacing between the flexible housing and the structural housing.

4. The cut alignment device of claim 1, further comprising a plastic battery holder that holds the battery power source in place and is located within the structural housing.

5. The cut alignment device of claim 1 further including a switch between the power source and the light source, for selectively applying power to the light source.

6. The cut alignment device of claim 5 in which the switch is centrifugally engaged, to automatically power the light source when the shaft is spinning.

7. The cut alignment device of claim 1, wherein the distance of the light source from the structural housing is adjustable, to adjust the angle at which the light beam emanates from the structural housing.

8. The cut alignment device of claim 7, further comprising means for coupling the light source to the structural housing once the light source is adjusted, to help prevent misalignment of the light source.

9. The cut alignment device of claim 1 comprising at least three radiating support arms that define at least three pockets.

10. The cut alignment device of claim 9 comprising four radiating support arms.

11. The cut alignment device of claim 1 in which the structural housing defines an aperture from which the light beam emanates.

12. The cut alignment device of claim 11 further including a focusing lens aligned with the aperture for focusing the light beam from the light source.

13. The cut alignment device of claim 12, wherein the distance between the light source and the lens is adjustable.

14. The cut alignment device of claim 1 in which the housing defines an aperture from which the light beam emanates at a distance of less than 0.160 inches from a portion of the structural housing that is against the blade.

15. The cut alignment device of claim 14 wherein the light beam intersects the plane of the blade at a distance of no more than eight feet from the structural housing.

16. The cut alignment device of claim 14 wherein the light beam intersects the plane of the blade at a distance of at least six inches from the structural housing.

17. A cut alignment device for a rotary saw having a motor which spins a cutting unit, the cutting unit including a rotary shaft driven by the motor, a circular blade having a central aperture through which the shaft fits, and a blade mounting device for holding the blade on the shaft, in which the blade-mounting device comprises a structural housing that is held on the shaft against the blade, and wherein a light source is located within the structural housing, the cut alignment device comprising:

a battery power source carried within the structural housing;

the light source, operatively connected to the power source, and carried within the structural housing wherein the light source projects a light beam from the structural housing directed toward the plane of the blade, to assist in cutting accurately; and a hardened material that mechanically couples the light source to the structural housing, in which the hardened material is heat conductive, to conduct heat from the light source to the structural housing.

18. The cut alignment device of claim 17 further comprising a somewhat flexible housing located within the structural housing and to which the light source is coupled, and at least one adjustment screw received in the flexible housing, wherein movement of said at least one adjustment screw relative to the flexible housing alters the spacing between the flexible housing and the structural housing.

19. The cut alignment device of claim 17, further comprising a plastic battery holder that holds the battery power source in place and is located within the structural housing.

20. The cut alignment device of claim 17 further including a switch between the power source and the light source, for selectively applying power to the light source.

21. The cut alignment device of claim 20 in which the switch is centrifugally engaged, to automatically power the light source when the shaft is spinning.

22. The cut alignment device of claim 17, wherein the distance of the light source from the structural housing is adjustable, to adjust the angle at which the light beam emanates from the structural housing.

23. The cut alignment device of claim 22, further comprising means for coupling the light source to the structural housing once the light source is adjusted, to help prevent misalignment of the light source.

24. The cut alignment device of claim 17 in which the structural housing defines an aperture from which the light beam emanates.

25. The cut alignment device of claim 24 further including a focusing lens aligned with the aperture for focusing the light beam from the light source.

26. The cut alignment device of claim 25, wherein the distance between the light source and the lens is adjustable.

27. The cut alignment device of claim 17 in which the housing defines an aperture from which the light beam emanates at a distance of less than 0.160 inches from a portion of the structural housing that is against the blade.

28. The cut alignment device of claim 27 wherein the light beam intersects the plane of the blade at a distance of no more than eight feet from the structural housing.

29. The cut alignment device of claim 28 wherein the light beam intersects the plane of the blade at a distance of at least six inches from the structural housing.

30. The cut alignment device of claim 17, wherein the structural housing is essentially a partially hollow cylinder with a raised inner central portion and at least two spaced raised support arms radiating from the central portion, the support arms thereby defining two or more pockets in which the battery power source and the light source are located.

31. The cut alignment device of claim 30 wherein the battery power source is located in one pocket and the light source is located in a different pocket.

32. The cut alignment device of claim 31 comprising at least three radiating support arms that define at least three pockets.

33. The cut alignment device of claim 32 comprising four radiating support arms.

34. A cut alignment device for a rotary saw having a motor which spins a cutting unit, the cutting unit including a rotary shaft driven by the motor, a circular blade having a central aperture through which the shaft fits, and a blade mounting device for holding the blade on the shaft, in which the blade-mounting device comprises a structural housing that is held on the shaft against the blade, and wherein a light source is located within the structural housing, the cut alignment device comprising:

a battery power source carried within the structural housing;

the light source, operatively connected to the power source, and carried within the structural housing wherein the light source projects a light beam from the structural housing directed toward the plane of the blade, to assist in cutting accurately; and a somewhat flexible housing located within the structural housing and to which the light source is coupled, and at least one adjustment device received in the flexible housing, wherein movement of said at least one adjustment device relative to the flexible housing alters the spacing between the flexible housing and the structural housing.

35. The cut alignment device of claim 34 wherein the battery power source is also mounted within the structural housing.

36. The cut alignment device of claim 34, further comprising a plastic battery holder that holds the battery power source in place and is located within the structural housing.

37. The cut alignment device of claim 34 further including a switch between the power source and the light source, for selectively applying power to the light source.

38. The cut alignment device of claim 37 in which the switch is centrifugally engaged, to automatically power the light source when the shaft is spinning.

39. The cut alignment device of claim 34, wherein the distance of the light source from the structural housing is adjustable, to adjust the angle at which the light beam emanates from the structural housing.

40. The cut alignment device of claim 39, further comprising means for coupling the light source to the structural housing once the light source is adjusted, to help prevent misalignment of the light source.

41. The cut alignment device of claim 34 in which the light source is mounted within the structural housing, and the structural housing defines an aperture from which the light beam emanates.

42. The cut alignment device of claim 41 further including a focusing lens aligned with the aperture for focusing the light beam from the light source.

43. The cut alignment device of claim 42, wherein the distance between the light source and the lens is adjustable.

44. The cut alignment device of claim 34, in which the structural housing defines an aperture from which the light beam emanates at a distance of less than 0.160 inches from a portion of the structural housing that is against the blade.

45. The cut alignment device of claim 44 wherein the light beam intersects the plane of the blade at a distance of no more than eight feet from the structural housing.

46. The cut alignment device of claim 44 wherein the light beam intersects the plane of the blade at a distance of at least six inches from the structural housing.

47. The cut alignment device of claim 34, wherein the structural housing is essentially a partially hollow cylinder with a raised inner central portion and at least two spaced raised support arms radiating from the central portion, the support arms thereby defining two or more pockets in which the battery power source and the light source are located.

48. The cut alignment device of claim 47, further comprising a hardened material that mechanically couples the light source to the structural housing.

49. The cut alignment device of claim 48, in which the hardened material is heat conductive, to conduct heat from the light source to the structural housing.

50. The cut alignment device of claim 47, wherein the battery power source is located in one pocket and the light source is located in a different pocket.

51. The cut alignment device of claim 50 comprising at least three radiating support arms that define at least three pockets.

52. The cut alignment device of claim 51 comprising four radiating support arms.

* * * * *